United States Patent

[11] 3,583,536

[72] Inventor Roger Magnier
 Billancourt, France
[21] Appl. No. 847,357
[22] Filed Aug. 4, 1969
[45] Patented June 8, 1971
[73] Assignees Regie Nationale Des Usines Renault
 Billancourt, France;
 Automobiles Peugeot
 Paris, France
[32] Priority Aug. 9, 1968
[33] France
[31] P.V.162,545

[54] SYNCHRONIZER FOR CHANGE-SPEED MECHANISMS
 1 Claim, 7 Drawing Figs.
[52] U.S. Cl. .................................................. 192/53A
[51] Int. Cl. ................................................. F16d 23/06
[50] Field of Search ........................................ 192/53.1

[56] References Cited
UNITED STATES PATENTS
2,957,564 10/1960 Peras ............................ 192/53(.1)

Primary Examiner—Allan D. Herrmann
Attorney—Stevens, Davis, Miller & Mosher

ABSTRACT: Synchronizer for change-speed mechanism which comprises a resilient split ring formed with a partially conical external surface and with internal bosses provided with cam faces adapted to coact with homologue cam faces formed on a member rotatably solid with the loosely rotating pinion to be synchronized, which comprises a dog insert, said synchronizer being characterized in that said member rigid with the pinion to be synchronizer comprises a pair of diametrally opposite slots engageable by tenons carried by driving member rotatably solid with said pinion and adapted to perform an eccentric movement in relation to said pinion.

PATENTED JUN 8 1971 3,583,536
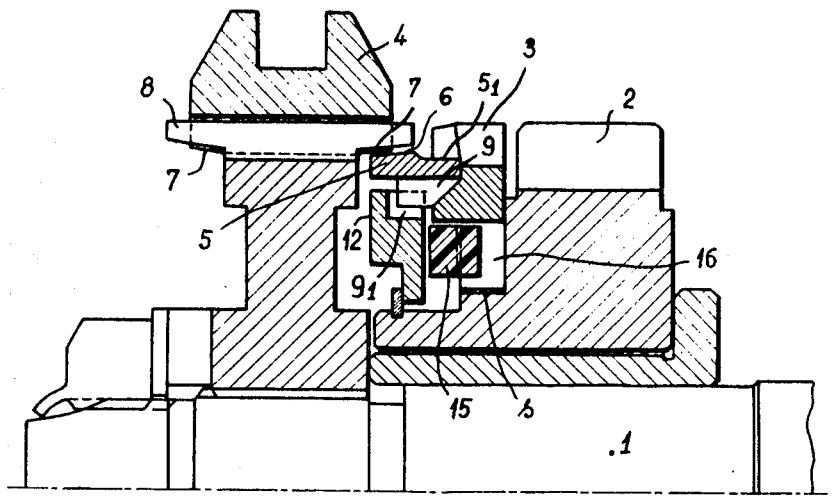
Fig. 1
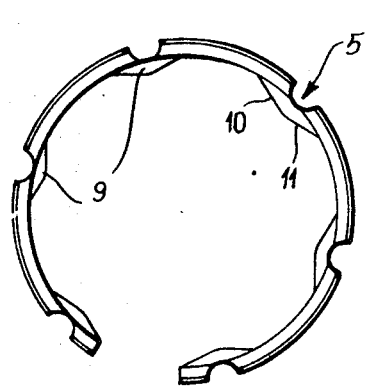
Fig. 2
Fig. 4
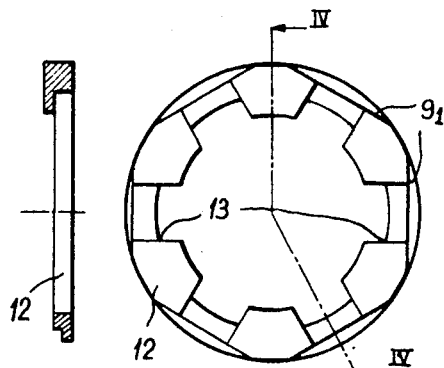
Fig. 3
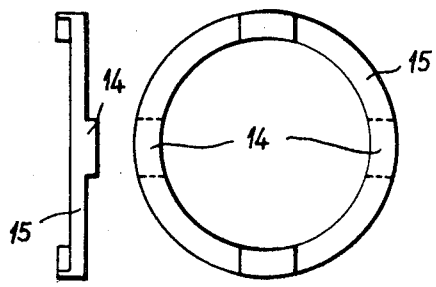
Fig. 6  Fig. 5
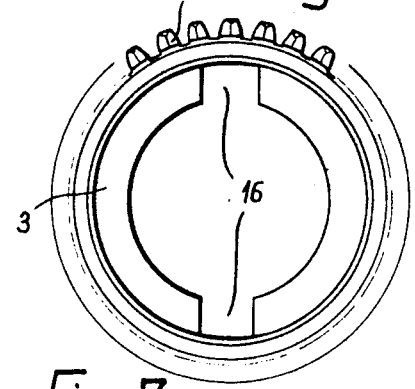
Fig. 7

SYNCHRONIZER FOR CHANGE-SPEED MECHANISMS

The present invention relates to change speed or transmission mechanisms and has specific reference to an improved synchronizer therefor which comprises a resilient ring having a tapered outer surface formed with bosses having a cam face function on the inner side for coacting with other bosses carried by a member rigid with the pinion to be synchronized, said ring being cut to permit a reduction of its diameter after at the end of the synchronization period. A synchronizer of this general type is already known through the U.S. Pat. No. 2,957,564 of Oct. 25, 1960. However, a synchronizer of this type requires a very accurate machining which is hardly consistent with the economical requirements of modern mass production.

It is known that any lack of precision in the position of the cam faces formed on the inner bosses of this split ring would permit an elastic reduction in the ring diameter, due to the partial and ill-distributed engagement thereof with the conjugate cam faces provided on the teeth of the member rigid with the pinion. Thus, the premature reduction in the diameter of the ring constantly urged to a contracted condition by the taper formed on the sliding selector would permit the free movement of this sliding hub towards the driving dog before the synchronization period is completed, thus making the synchronizer inefficient.

With the synchronizer according to this invention this inconvenience is safely avoided. The synchronizer according to the present invention, which comprises a resilient split ring having a tapered outer surface and formed with truncated inner bosses provided with cam faces adapted to coact radially with homologue cam faces formed on a member rigid with the pinion to be synchronized, provided with an insert or integral dog, is characterized in that said member comprises a pair of radial slots coacting with tenons tenons carried by a member rotatably solid with, and adapted to perform an eccentric movement in relation to, said pinion, according to the known feature characterizing the Oldham joint.

With this synchronizer construction the two elements provided with said cam faces become mutually self-centering, this characteristic resulting from the relative engagement of said conjugate cam faces under the influence of the torque to which said split ring is submitted when its tapered portion engages the corresponding taper formed on the bore of the sliding selector.

This synchronizer, as described hereinafter, is characterized by reduced overall dimensions and a considerable compactness.

Other advantageous features will appear as the description of a specific form of embodiment of the synchronizer according to this invention proceeds with reference to the accompanying diagrammatic drawing, in which:

FIG. 1 is a half longitudinal section of the device;

FIG. 2 is a detail view showing the split ring of the synchronizer;

FIG. 3 is a detail view showing the slotted element provided with the external cam faces;

FIG. 4 is a section taken along the line IV–IV of FIG. 3;

FIG. 5 is a front view showing the tenon-driving member;

FIG. 6 is a side elevational view of the same member; and

FIG. 7 is a front view of the dog insert formed with the driving notches.

Referring first to FIG. 1 it will be seen that the output shaft 1 carries the pinion 2 to be synchronized, which comprises a dog insert 3 bonded to the pinion 2 by welding as at $s$. This pinion 2 is mounted for loose rotation on shaft 1. A sliding selector 4 centered on the outer teeth of a hub 8 rigid with shaft 1 is adapted to slide axially on said teeth under the control of a selector fork (not shown). The sliding selector is adapted, at the end of the synchronization period between pinion 2 and shaft 1, to mesh with said dog 3.

Pinion 2 carries a synchronizer ring 5 of which the external tapered surface 6 is adapted to engage in the known manner the female taper 7 of sliding selector 4 of which the inner teeth are centered on the hub 8.

The synchronizer ring 5 carries a cylindrical surface $5^1$ forming the extension of the tapered surface 6 and adapted to center said ring and also to limit its expansion. As shown in FIG. 2, this ring is discontinued along one fraction of its circumference and carries on the inner side a plurality of bosses 9 formed with tapered sidewalls or cam faces 10, 11 coacting with registering and homologue oblique sidewalls or cam faces $9^1$ of a core member 12 rotatably rigid with pinion 2. The core 12 is rotatably solid with pinion 2 through the intermediary of a drive mechanism 15. To this end, drive mechanism 15 is provided with studs 14 that engage the cavities (recesses) 13 of core 12 and the radial notches 16 of the insert dog 3. Since the insert dog 3 is solid with pinion 2, it follows that there is established a solid connection between core 12 and pinion 2. According to this invention, said core member 12 has formed therein notches 13 engageable by tenons 14 formed on a driving member 15 usually referred to as an Oldham joint. The driving portion of this joint coacts with a pair of radial notches 16 of the insert dog 3 bonded to said pinion 2 by being welded thereto at $s$ as already explained hereinabove, said driving member 15 being adapted to perform radial movements to eccentric positions with respect to the axis of the bore of said free-rotating pinion 2.

Some of the component elements of this synchronizer, for example the synchronizer ring and the core, which required heretofore delicate and highly accurate mechanical machining operations, may now be obtained at their final dimensions from sintered metals and the driving member itself may be moulded from plastic materials. It is known that the use of these materials is particularly advantageous in mass production processes.

The synchronizer according to this invention operates as follows:

When the sliding selector 4 is moved to the right (FIG. 1) the female cone 7 of this sliding selector 4 is caused to engage the male cone 6 of ring 5.

Due to the frictional engagement thus produced, the sliding selector 4 will tend to carry along the synchronizer ring 5 in one or the other direction, according as the higher or lower gear is engaged. The rotation of the synchronizer ring will be limited by the engagement or contact of its inner cam faces 10 or 11 with the external cam faces $9^1$ of core 12.

During a first period the core will center itself within the ring. This centering movement causes at least three contacts to take place on the cam faces such as 10, 11 which are distributed at balanced intervals along the interval circumference of the split ring. The torque received by the ring will partially be converted by this cam face contact into a reaction tending to open the ring and keep same in bearing engagement with its cylindrical surface $5^1$ contacting the dog insert.

Assuming that shaft 1 is the drive shaft, when the sliding selector 4 frictionally drives the synchronizing ring 5, the rotation of the synchronizing ring 5 is limited by the contact of its various interior cam faces 10 or 11 (depending upon the direction of rotation) with the exterior cam face $9_1$ of core 12.

According to the embodiment described, the core 12 is capable of becoming eccentric so as to have at least three points of contact at the cam faces of the synchronizing ring. In order to arrive at these three points of contact and consequently the centering of core 12 in the synchronizing ring 5, it is possible to utilize an Oldham joint (a mechanism that permits the transmission of a rotational movement between two parallel shafts having adjoining axes).

In view of the fact that the joint is utilized in the manner just described, i.e., to have movable core 12 rotatably solid with pinion 2, it is possible to obtain an automatic radial displacement of core 12 as soon as one of its cam faces $9_1$ comes in contact with a cam face 10, 11 of the synchronizing core. This displacement will last until the axis of rotation of core 12 occupies a stable position with respect to the axis of rotation of pinion 2.

Referring to FIG. 1, it can be seen that the synchronizing ring 5 has a cylindrical surface $5_1$ in contact with insert dog 3. Since this cylindrical surface prevents outward expansion of split ring 5, it can be seen that this provides at least three contacts between the core 12 and the ring 5 distributed in a balanced fashion along the interior circumference of split ring 5. In view of the foregoing, it can be seen that the driving member 15 has the essential function of centering the core 12 in ring 5.

It also can be seen that, as a consequence, the driving member 15 permits obtaining a correct position (with a minimum of three supporting points) of the synchronizing ring 5 upon core 12 as long as the synchronization is not obtained. Thus, it is possible to provide a synchronizer with rings 5 and cores 12, the cam faces of which are not of a precise geometrical configuration. The ring 5 and the core 12 may therefore be used in a crude and not machined condition if they are made of fritted metal powders.

Throughout the synchronization time, as long as the ring is urged for rotation as a consequence of the difference between the angular speeds of the driving and driven members, the diameter of the synchronizer ring remains unchanged and safely prevents the movement of sliding selector 4 towards the dog insert 3.

When the desired synchronization is obtained, the torque transmitted through the cones is cancelled and as a consequence the cam faces of ring 5 will no more counteract the contraction of its diameter. The sliding selector pushed by the selector fork (not shown) causes the ring 5 to be contracted, the resulting reduction in the ring diameter causing the retraction of this ring and its noiseless engagement on the dog insert 3, thus providing the desired coupling between shaft 1 and pinion 2.

Of course, various modifications and variations may be brought to the specific form of embodiment shown and described herein by way of example, without however departing from the spirit and scope of the invention as set forth in the appended claim.

I claim:

1. Synchronizer for change speed mechanism which comprises a resilient split ring formed with a partially conical external surface and with internal bosses provided with cam faces adapted to coact with homologue cam faces formed on a member rotatably rigid with the loosely rotating pinion to be synchronized, said synchronizer being characterized in that said member rigid with the pinion to be synchronized comprises a pair of diametrally opposite notches engageable by tenons carried by a driving member rotatably solid with said pinion and adapted to perform an eccentric movement in relation to said pinion.